J. H. KOCH AND W. J. LARSEN.
BOOK MAKING MACHINE.
APPLICATION FILED DEC. 10, 1919.

1,372,236.

Patented Mar. 22, 1921.
4 SHEETS—SHEET 3.

INVENTOR
J. H. Koch
W. J. Larsen
BY
ATTORNEY

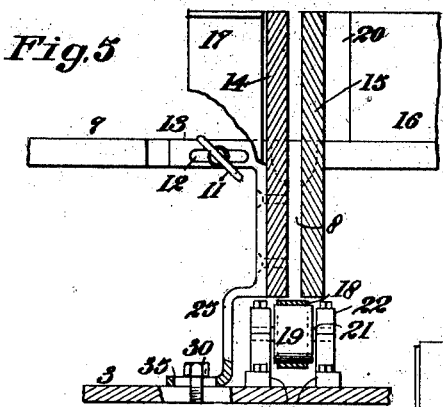

UNITED STATES PATENT OFFICE.

JOHN H. KOCH AND WILLIAM J. LARSEN, OF SAN FRANCISCO, CALIFORNIA, ASSIGNORS OF ONE-FOURTH TO JAMES H. BRADY AND ONE-FOURTH TO HOWARD C. TIBBITTS, BOTH OF SAN FRANCISCO, CALIFORNIA.

BOOK-MAKING MACHINE.

1,372,236. Specification of Letters Patent. Patented Mar. 22, 1921.

Original application filed September 17, 1918, Serial No. 254,475. Divided and this application filed December 10, 1919. Serial No. 343,909.

*To all whom it may concern:*

Be it known that we, JOHN H. KOCH and WILLIAM J. LARSEN, citizens of the United States, and residents of San Francisco, in the county of San Francisco and State of California, have invented new and useful Improvements in Book-Making Machines, of which the following is a specification.

The object of the present invention is to provide a machine for gluing backs or covers to the bodies of magazines or books which will operate automatically and without any care or attention except that of feeding said covers and bodies thereto, and which can be adjusted for operating on magazines or books of different thicknesses, the present application being a division of an application filed by us Sept. 17, 1918, Ser. No. 254,475.

Figure 1:
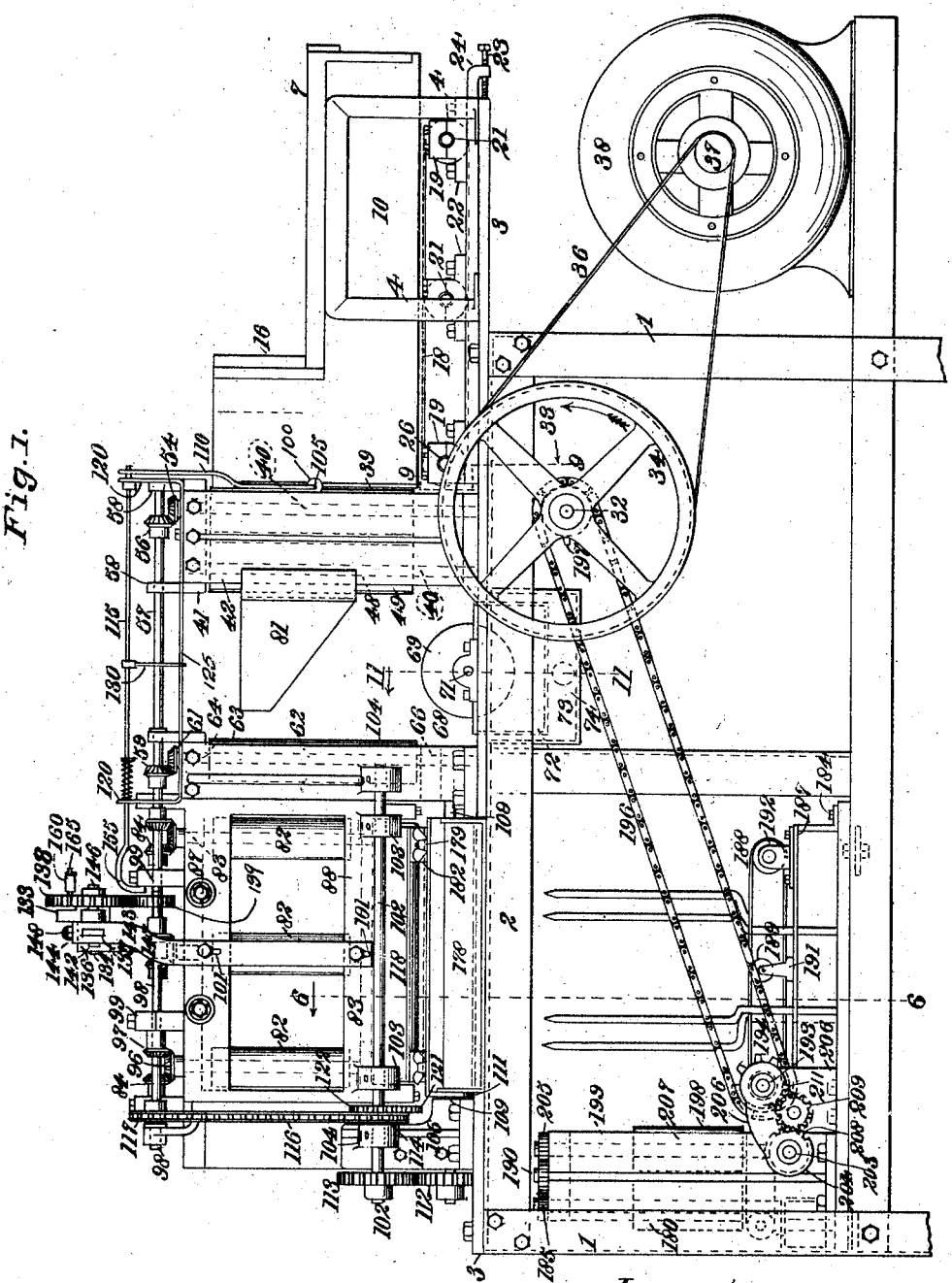
Figure 2:
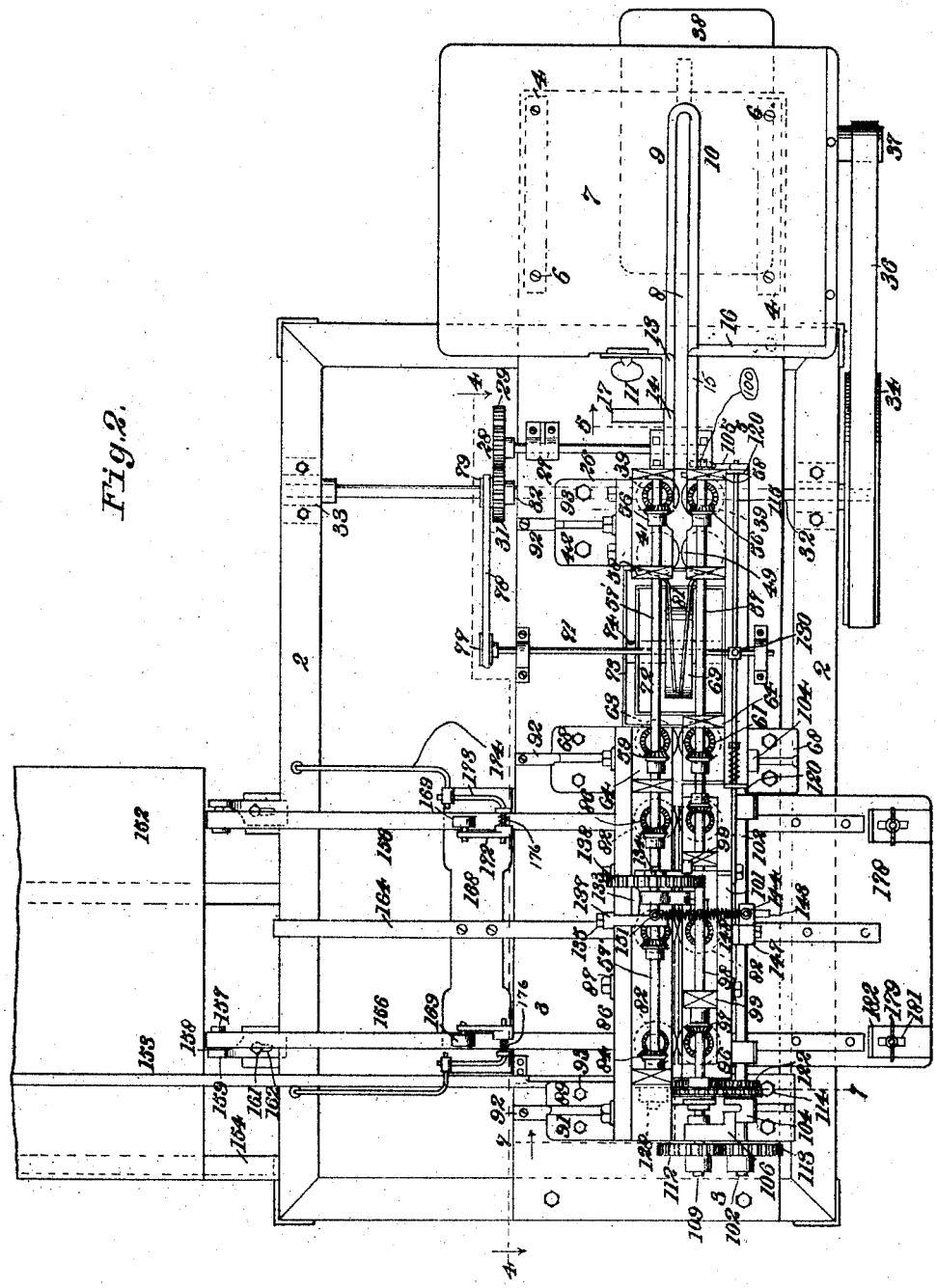
Figure 3:
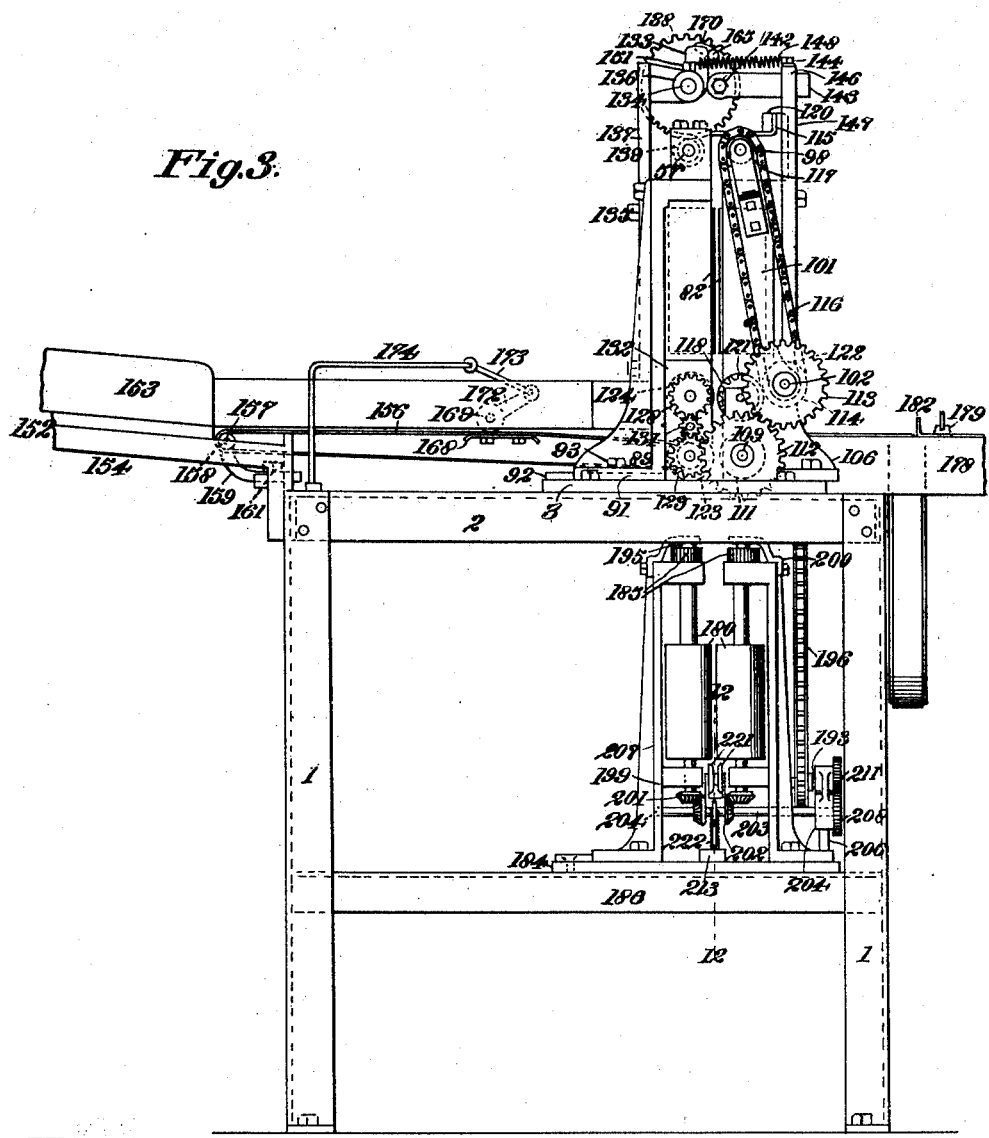
Figure 4:
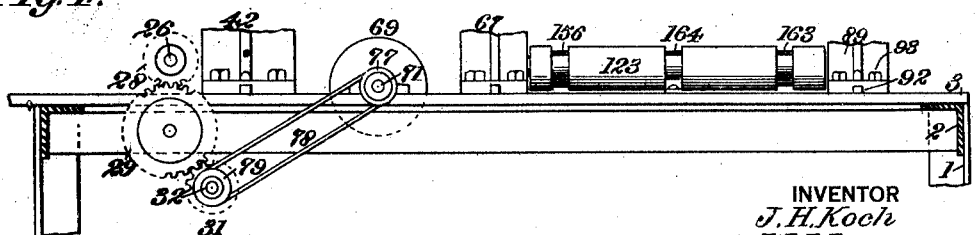

In the accompanying drawing, Figure 1 is a side view of our improved gluing machine; Fig. 2 is a plan view thereof; Fig. 3 is a front end view thereof; Fig. 4 is a partial vertical section on the line 4—4 of Fig. 2; Fig. 5 is a vertical cross section on the line 5—5 of Fig. 2; Fig. 6 is a similar view on the line 6—6 of Fig. 1; Fig. 7 is a similar view on the line 7—7 of Fig. 2; Fig. 8 is a horizontal section on the line 8—8 of Fig. 9; Fig. 9 is a transverse vertical section on the line 9—9 of Fig. 1; Fig. 10 is a horizontal section on the line 10—10 of Fig. 9; Fig. 11 is a transverse vertical section on the line 11—11 of Fig. 1; Fig. 12 is an enlarged detail vertical longitudinal section on the line 12—12 of Fig. 3; Fig. 13 is a side view of a detail of construction.

Referring to the drawings, 1 indicates uprights supporting a horizontally extending rectangular frame 2, upon which is secured a longitudinally extending table 3, narrower than the frame, said table projecting behind the rear or feed end of the frame. Upon said projecting end of the table are supported rectangular upright frames 4 to the upper portions of which are secured, by screws 6 a feed table 7. Said feed table 7 is formed with a longitudinally extending open-ended slot 8, opening through the front edge of the table, and depending from said table in said slot are walls 9, 10, which serve as guides below the feed table. The book or magazine bodies to which the cover is to be glued are placed in a pile on the feed table 7 to the right of the slot, and are fed by hand, one at a time, into said slot or guideway and between said guides. A wall 10 on one side of the slot 8 is extended forwardly, as shown at 15, and in front of the wall 9 on the other side of the slot is a wall 14, said wall 14 and extension 15 being extended upwardly above the feed table 7. The wall 14 is adjustable to and from the extension 15 by means of an angular upright 25 secured to the wall 14 and having a slot 35 through which passes a screw 30 secured into the table 3, said upright also having a right-angled extension 13, which is adjustably screwed to the table 7 by a screw 11 passing through a slot 12 in said extension 13 and screwed into the edge of said table 7. Secured to the upwardly extending portion of the extension 15 by a corner piece 20 is a wall 16, extending at a right-angle to the said slot 8, and serving to brace the table 7 and as a protector and guide for the front edges of the magazine or book bodies. An angular protector 17 is also secured to the upper portion of the wall 14.

The lower edge of the magazine or book body deposited through said open-ended slot drops upon a belt 18 which travels around three rollers 19 on shafts 21 in pairs of bearings 22 secured to the table, the rearmost pair of bearings being adjustable, to tighten the belt around the rollers, by means of screws 23 screwed through downwardly extending front ends of plates 24 upon which said rear bearings are supported, and which plates are secured to the table 3, the forward ends of said screws abutting against the rear edge of said table 3. The shaft 26 in the foremost bearings extends also through a bearing 27 and carries on its outer end a pinion 28, which meshes with a gear wheel 29, which in turn meshes with a gear wheel 31 on a transverse shaft 32 rotating in bearings 33 depending from, and secured to the under side of, the frame 2. On an end of said shaft 32 is secured a wheel 34 around which travels a belt 36 which also travels around a shaft 37 of a suitably supported electric motor 38. By the rotation of the shaft 37, and, therefore, also of the shaft 32, and the forward movement of the upper portion of the belt 18, the magazine or book body is carried forwardly and its advancing edge passes between a pair of vertical rollers 39. The shafts 40 of these rollers have their bearings in upper and lower horizontal plates 41 extending inwardly from castings or uprights 42, having angular lower ends secured to the upper surface of the table 3.

The left-hand one of the pair of shafts 40, looking in the direction of advance of the magazine bodies, extends downwardly through said table 3 and carries on its lower end a miter gear 43, (Fig. 9), which meshes with a miter gear 44 on said transverse shaft 32, and thereby said vertical shaft 40 is rotated. It imparts rotation to the other shaft 40 by means of gear wheels 46 on said vertical shafts 40 which mesh respectively with intermediate gear wheels 47, which mesh with each other. The shafts 45 of said gear wheels 47 are adjustably secured by bolts 50, and washers 55 in slots 60 in a casting 65 secured to the under side of the table 3. Also having bearings in said upper and lower plates 41 are shafts 48 of a pair of rollers 49 (Fig. 1) between which the magazine bodies pass after passing between the pair of rollers 39. All of the rollers between pairs of which the magazine bodies pass have their surfaces of rubber or other yielding material.

Said shafts 48 are rotated from the shafts 40, (Fig. 8) by gear wheels 51, 52, on said shafts 48 and 40, and intermediate gear wheels 53 meshing with said gear wheels 51, 52. These wheels 51, 52, 53 are located between the table 3 and the plates 41.

The upper ends of the shafts 40 carry miter gears 54 which mesh with miter gears 56 on longitudinally and horizontally extending shafts 57, 57', having bearings in uprights 58 extending upwardly from the upper plates 41.

Further advanced portions of the shafts 57, 57', (Figs. 1, 2), carry miter gears 59 which mesh with miter gears 61 on vertical shafts 62 carrying another pair of vertically extending rubber rollers 63, said shafts 62 having upper and lower bearings in plates 64, 66 extending inwardly from castings 68 secured on the table 3 and similar to the castings 42. By means of said pairs of rollers 39, 49, and 63, said magazine bodies are advanced so that their lower edges travel in contact with the upper surface of a gluing roller 69 on a shaft 71, and which rotates in an open-topped glue-pot 72. Said glue pot is maintained hot by having its lower part immersed in a water container 73, (Fig. 11), in which water is heated by an electric heater 74 to which wires 76 lead from any suitable source of electricity. Said gluing roller is positively rotated by means of a grooved wheel 77, (Figs. 2 and 4) on said shaft 71 around which travels a round band 78 which also travels around a grooved wheel 79 upon the transverse shaft 32.

In order that it may be insured that they pass between the rollers 63, the outer leaves of the magazine or book body are prevented from spreading, when passing over said gluing roller, by means of spring metal guide plates 81, (Figs. 1, 2), secured to the uprights 42, extending forwardly therefrom and converging toward their front ends, so as to press the leaves of the magazine or book body together as it passes therebetween.

By the above means the magazine body is fed in succession into the spaces between three pairs of rollers 82 on vertical shafts 83. The rollers on the right hand side are driven by means of the longitudinally extending shaft 57', which has thereon miter gears 84 meshing with miter gears 86 on the upper ends of the right hand vertical shafts 83. Said latter shafts 83 have upper and lower bearings in plates 87, 88, extending inwardly from a vertically directed and longitudinally extending plate or casting 89, having lower horizontally extending portions 91 secured upon the table 3.

In order to adjust the machine for magazine or book bodies of different thicknesses, the castings 42, 68, and 89 which support the bearings for the long shaft 57' are slidable transversely of said shaft 57', being guided by guides 92 secured on said table 3, and are secured by bolts 93 which extend through transversely extending slots 94 in the table 3.

The shafts of the rollers 82 on the left hand side of the machine carry at their upper ends miter gears 96, which mesh with miter gears 97, (Fig. 1), on a horizontally and longitudinally extending shaft 98 normally in alinement with the shaft 57, and having bearings in uprights 99 extending upwardly from a casting 101 which has apertured ears 103 supporting a shaft 102, which has bearings 104 in the left-hand casting 68 and in a standard 106 secured to the table 3. Said shafts 98 and 102 derive their motions in the following manner:—On the lower portion of the rearmost left-hand shaft 62 (Fig. 11) is a miter gear 107 which meshes with a miter gear 108 on a horizontally and longitudinally extending shaft 109, (Figs. 3, 6), carrying a roller 111, which shaft 109 also carries a gear wheel 112 which meshes with a gear wheel 113 upon the shaft 102. Said shaft 102 also carries a sprocket wheel 114, (Figs. 1, 6), around which travels a sprocket chain 116 which also travels around a sprocket wheel 117 on said shaft 98. Above the roller 111 is a roller 118 on a shaft 119, (Fig. 7), carrying a gear wheel 121 which meshes with a gear wheel 122 on the shaft 102. By this means said roller 118 is rotated.

On the right-hand side of the machine and coöperating respectively with the rollers 111, 118 on the left-hand side, are horizontal rollers 123 and 124, the lower one 123 of which derives its motion from a miter gear 126 on the rear end of its shaft, (Fig. 11), meshing with a miter gear 127 on the shaft 62 of the right-hand roller 63. The upper roller 124 derives its motion from the lower roller 123 by means of gear wheels 128, 129, (Figs. 7 and 3), on shafts of said rollers and an intermediate gear wheel 131 upon a stud shaft extending from a plate 132 secured to the casting 89 and movable therewith.

When the magazine body is fed between the three pairs of vertically extending rollers 82, its lower edge lies between the rollers 118 and 124, but is out of contact therewith, so that it can be moved freely in a longitudinal direction between the three pairs of vertically extending rollers. The rollers of the vertically extending pairs of rollers 82 are then caused to separate from each other by means of a cam 133, (Figs. 1, 2, 3), on a shaft 134 mounted in a bearing 136 upon a post 137 secured to the adjustable plate or casting 89, and adjustable vertically thereon by means of screws 135 (Fig. 13) through slots 140 in said post, screwed into said casting 89, which shaft 134 also carries a gear wheel 138 meshing with a pinion 139 on the longitudinally extending shaft 57'. Thereby said cam shaft is rotated. In its rotation the cam 133 presses against a cam roller 141 on a shaft 142 secured upon an arm 143 adjustably secured by a set screw 144 in a slot 146 in the upper end of a post 147 secured to the vibratable casting 101. Said cam roller is drawn toward said cam by means of a coiled spring 148 of which one end is secured to the set screw 144 which secures in place the arm 143 and the other end is secured to a set screw 151 which secures in place the shaft 134.

At the proper time, therefore, in the operation of the machine, the vibratable casting 101, carrying with it the vertically extending rollers 82 on one side of the machine, is vibrated by the cam 133, and thereby the magazine body is no longer pressed between the pairs of vertical rollers 82, but drops, and its lower edge, having thereon the requisite quantity of glue received from the gluing roller 69, drops onto a cover, which, by mechanism now to be described, has been moved into the position proper to receive said glued edge.

In order to insure that each magazine body will arrive at the proper time between the rollers 82, and the vibratable frame 101 will be vibrated at the proper time to permit the magazine body to drop, the magazine bodies are in succession arrested in their movement on the belt 18 by a finger 100 (Fig. 2) which extends in front of the space between the wall 14 and extension 15, and is bent inwardly from an arm 105, which extends through a recess in the front edge of the wall 15, said arm being bent horizontally from the lower end of a rod 110, the upper end of which is secured upon the rear end of a shaft 115, having its bearings in the ends of upwardly bent ends 120 of a bar 125, secured to the uprights 42, 63, there being secured to said shaft 115 an arm 130, which, in the rocking movement of the shaft 115, is arrested by said bar 125, and forms a step for arresting said rocking movement. The front end of said shaft 115 is bent to form an arm 155, (Fig. 1), which extends closely adjacent to the rear surface of the gear wheel 138, and is adapted to be engaged by a roller 160 on a pin 165 adjustably secured in an arcuate slot 170, (Fig. 3), of said gear wheel. At the proper time in the rotation of the gear wheel 138, said roller actuates said arm 155 to rock the shaft 115, and withdraws the finger 100 from in front of the front edge of the magazine which is supported by the traveling belt 18 and permits said magazine to advance.

152 indicates a cover feed table, extending in a direction transverse to the general direction of the machine, and supported by a suitable frame 154 adjacent to the rear end of the gluing machine and having secured thereon a guide wall 153. The covers are fed by hand onto endless belts 156 which travel around rollers 157 on shaft 158 carried by arms 159 adjustably secured by screws 161 passing through slots 162 in said arms and screwed into said frame 2, said belts also passing around grooved portions 163, (Figs. 4, 6), of the lower horizontal roller 123. A flat strip 164, (Figs. 2, 4), is located midway between, and at the same level as, said belts 156 and its ends are bent down and secured, at one end to the rear edge of the frame 2, and at the other end to the table 3, (Figs. 2, 4). On the under side of the strip 164 is secured a transversely extending support 168 over which the belts 156 travel, the cover being held down to said belts by rollers 169 rotatably supported in the ends of arms 172, the other ends of which are pivoted upon the bent ends of arms 173, the other ends of which are adjustably secured upon the bent ends of wire supports 174. Springs 176 coiled around said arms 173 depress the arms 172 and the rollers 169 carried thereby.

It will be evident that said belts are caused to travel by the rotation of said roller 123. By this means each cover in succession is fed between said horizontal rollers 123 and 124 and also between the pairs of opposite rollers 111, 118, and onto a table 178 supported over the table 3, (Fig. 6), and having adjustably secured thereon, by means of thumb screws 179 through slots 181, stops 182 having vertically extending portions against which the forward end of the cover abuts. The cover has now been brought to the proper position to receive on its central portion the glued lower edge of the magazine body brought to the proper position by the means described.

When said body drops on to said cover it is immediately thereafter clamped by the upper roller 118 pressing against the upper roller 124, said upper roller 118 being located below the shaft 102 on which the casting 101 vibrates. By the vibration of said casting by means of said cam 133, said roller 118 is moved inwardly at the same time that the upper portion of the casting and the vertical rollers 82 therein are moved outwardly. Thereby and by the downward motion of the inner sides of the rollers 118 and 124, the magazine body and the cover are positively drawn down and are caused to pass between the lower rollers 111 and 123, and by the continued rotation of said rollers, the magazine, with the cover glued thereto, is drawn downward. It is guided in its downward movement, between said lower rollers, 111, 123, by means of two pairs of upwardly extending rods 183, (Figs. 1, 6), having pointed upper ends the lower portions of said rods being secured in a plate or casting 184 supported upon an intermediate frame 186 and extending therefrom first upwardly and through holes in flat bars 187 bent downward at the ends and secured to said casting 184, then inwardly over a belt 188 and then upwardly again. The pairs of rods, on opposite sides of the belt 188, are so located that the magazine or book is guided downwardly until its lower edge is in contact with said belt. The middle portion of said belt, with which the magazine is in contact, is supported on the under side by a roller 189, the shaft of which is rotatably supported at its ends in standards 191 upon the bars 187.

Said belt travels around rollers 192, and the shaft 193 of one of said rollers carries a sprocket wheel 194 by which it can be rotated, said sprocket wheel having therearound a sprocket chain 196, which also passes around a sprocket wheel 197 upon the transverse shaft 32.

The completed magazine or book is thus conveyed by said belt between a pair of vertical rollers 198, on shafts 199 which are rotated by means of miter gears 201 thereon (as shown in Fig. 3) meshing with miter gears 202 on a shaft 203 rotating in bearings 204, in a plate 206 and in one of the supports 207, and carrying a gear wheel 208 which meshes with an intermediate gear wheel 209 which meshes with a gear wheel 211 on the shaft 193. The magazine or book then passes between another pair of rollers 180, rotated by gear wheels 185 on their shafts, meshing with intermediate gear wheels 190, on vertical shafts 195 having their lower bearings in the supports and their upper in brackets 200 secured to said supports, which gear wheels 190 mesh with gear wheels 205 on the shafts 199.

The middle portion of the cover, which surrounds the lower edge of the magazine, and is adjacent to its glued portion has up to the present time received only a rounded form. It is necessary to give this portion of the cover a square or angular form, to conform to, and fit closely against, the lower edge of the magazine body. For this purpose there is bolted to the plate 184, as shown at 212, (Fig. 12) a block 213, through a central hole in which extends upwardly a round bar 214, the lower end of which is threaded, and screwed on said threaded lower end is a nut 216 which is received in a hole in the under side of said block. The upper end of said bar carries a support 217, from which extend upwardly arms 218, between which is rotatably carried a shaft 219 carrying disks 221 spaced from each other a distance substantially equal to the thickness of the magazine at its gummed edge, the inner or opposing faces of said disks having beveled edges. From said support 217 rods 222 extend first longitudinally and then downwardly and into holes 223 in the block, and thereby prevent the turning of the support 217 about said bar 214 as a vertical axis. A spring 224 is coiled around said bar 214 and compressed between said support 217 and said block 213, and normally raises said support. Said block is so placed that the disks are located to receive the edge of the completed magazine as it comes from the foremost roller, the lower edge of the magazine body first entering the upper portion of the space between said disks and pressing said support 217 and disks downwardly against the pressure of the spring 224 which acts to press the middle portion of the cover close to the sides of the magazine to change the edge of the magazine from a rounded to a rectangular form.

We claim—

1. In a gluing machine, the combination of a supporting table, frames one of which is vibratable, pairs of vertical rollers, the rollers of the several pairs being mounted respectively in said frames, a pair of horizontal rollers beneath the vertical rollers and mounted in the respective frames, the horizontal roller in the vibratable frame being mounted below its axis of vibration, means for rotating said horizontal and vertical rollers, means for vibrating the vibratable frames, so that its upper portion moves outward from the other frame and the horizontal roller carried thereby approaches the other horizontal roller, a second pair of horizontal rollers beneath the first pair thereof, and an endless traveling band, actuated by one of said lower horizontal rollers, for conveying thereto a cover placed on said band.

2. In a gluing machine, the combination of a supporting table, frames one of which is vibratable, pairs of vertical rollers, the rollers of the several pairs being mounted respectively in said frames, a pair of horizontal rollers beneath the vertical rollers and mounted in the respective frames, the horizontal roller in the vibratable frame being mounted below its axis of vibration, means for rotating said horizontal and vertical rollers, means for vibrating the vibratable frame, so that its upper portion moves outward from the other frame and the horizontal roller carried thereby approaches the other horizontal roller, a second pair of horizontal rollers beneath the first pair thereof, and an endless traveling band, actuated by one of said lower horizontal rollers, for conveying thereto a cover placed on said band, and a stop for arresting the movement of said cover.

3. In a gluing machine, the combination of a supporting table, frames one of which is vibratable, pairs of vertical rollers, the rollers of the several pairs being mounted respectively in said frames, a pair of horizontal rollers beneath the vertical rollers and mounted in the respective frames, the horizontal roller in the vibratable frame being mounted below its axis of vibration, means for rotating said horizontal and vertical rollers, means for vibrating the vibratable frame, so that its upper portion moves outward from the other frame and the horizontal roller carried thereby approaches the other horizontal roller, a second pair of horizontal rollers beneath the first pair thereof, one of the latter being grooved, and an endless band in said groove for conveying thereto a cover placed on said band.

4. In a gluing machine, the combination of a supporting table, frames one of which is vibratable, pairs of vertical rollers, the rollers of the several pairs being mounted respectively in said frames, a pair of horizontal rollers beneath the vertical rollers and mounted in the respective frames, the horizontal roller in the vibratable frame being mounted below its axis of vibration, means for rotating said horizontal and vertical rollers, means for vibrating the vibratable frame, so that its upper portion moves outward from the other frame and the horizontal roller carried thereby approaches the other horizontal roller, a lower pair of horizontal rollers and an endless traveling band, actuated by one of said lower horizontal rollers, for conveying thereto a cover placed on said band.

5. In a gluing machine, the combination of means for feeding a magazine body or the like extending in a substantially vertical plane, means for feeding a cover extending in a substantially horizontal plane into a position in which the middle of the cover is beneath the magazine body, a pair of horizontal rollers beneath the magazine body, on to which the cover is fed by said cover feeding means, means for releasing said magazine body from said body feeding means to permit it to drop therefrom, horizontal rollers, means for pressing them together to press the sides of the cover against the magazine body, and an endless traveling belt beneath said horizontal rollers, means for guiding the magazine on to said belt, a pair of vertical rollers registering with said endless belt between which the magazine body is conveyed by said belt, and means for rotating said rollers, operating said traveling belt, and actuating all of said means, in harmony.

6. In a gluing machine, the combination of means for feeding a magazine body or the like extending in a substantially vertical plane, means for feeding a cover extending in a substantially horizontal plane into a position in which the middle of the cover is beneath the magazine body, a pair of horizontal rollers beneath the magazine body on to which the cover is fed by said cover feeding means to permit it to drop therefrom, horizontal rollers, means for pressing them together to press the sides of the cover against the magazine body, and an endless traveling belt beneath said horizontal rollers, means for guiding the magazine on to said belt, a pair of vertical rollers registering with said endless belt between which the magazine body is conveyed by said belt, means for rotating said vertical rollers, operating said traveling belt, and actuating all of said means, in harmony, and a grooved roller for pressing the cover to the bound edge of said magazine, located in front of the space between said vertical rollers.

7. In a gluing machine, the combination of a vertically extending guide-way adapted to receive in succession magazine bodies, an endless traveling belt beneath said guide-way on to which the bound edges of the magazine bodies can drop, means for arresting the advance of said magazine bodies when supported by said belt, a pair of vertically extending rollers between which said magazine body can travel when advanced by said belt, a horizontally extending gluing roller over which said bound edge can travel, means for applying adhesive material to the surface of said gluing roller, means for compressing the advancing edges of said magazine body when traveling over said gluing roller, a pair of vertical rollers in advance of said compressing means between which said magazine body is interposed, a tilting frame, means for tilting said frame, means operated in harmony with said tilting means, for withdrawing said arresting means, vertical rollers rotatably supported in said frame, stationarily supported companion vertical rollers therefor, a horizontal pair of rollers beneath said vertical rollers, and above the level of said gluing roller, one of said horizontal rollers being supported by the frame below its axis of vibration, a second pair of horizontal rollers beneath the first pair of horizontal rollers, means for advancing a cover in the space between the pairs of horizontal rollers, guiding means beneath said second pair of rollers, an endless traveling belt on to which the magazine bodies are guided by said guiding means, a pair of vertical rollers between which the magazine body is advanced by said traveling belt, and a resiliently supported grooved roller in front of said last-named rollers, and adapted to receive the bound edge of said magazine.

JOHN H. KOCH.
WILLIAM J. LARSEN.